(12) United States Patent
Ramadasse et al.

(10) Patent No.: US 12,113,898 B2
(45) Date of Patent: *Oct. 8, 2024

(54) BINDING WITH CRYPTOGRAPHIC KEY ATTESTATION

(71) Applicant: Microsoft Technology Licensing, LLC, Redmond, WA (US)

(72) Inventors: Prabagar Ramadasse, Redmond, WA (US); Yordan Rouskov, Redmond, WA (US); Mick Healy, Redmond, WA (US); Gaurav Dhawan, Redmond, WA (US); Venkata Raghuram Pampana, Redmond, WA (US); Aleksandr Tokarev, Redmond, WA (US); Marc Shepard, Redmond, WA (US); Ramachandra Ravitej Vennapusa, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/224,518

(22) Filed: Jul. 20, 2023

(65) Prior Publication Data
US 2023/0379152 A1 Nov. 23, 2023

Related U.S. Application Data

(63) Continuation of application No. 17/332,796, filed on May 27, 2021, now Pat. No. 11,750,384.

(51) Int. Cl.
*H04L 9/32* (2006.01)
*H04L 9/08* (2006.01)
(Continued)

(52) U.S. Cl.
CPC .......... *H04L 9/3073* (2013.01); *H04L 9/0866* (2013.01); *H04L 9/3234* (2013.01);
(Continued)

(58) Field of Classification Search
CPC ....... H04L 9/08; H04L 9/0866; H04L 9/0836; H04L 9/30; H04L 9/302; H04L 9/3073;
(Continued)

(56) References Cited

U.S. PATENT DOCUMENTS 11,374,766 B2* 6/2022 Laitinen ................... G06F 21/57
2008/0320308 A1* 12/2008 Kostiainen ............ H04L 63/123
713/171
(Continued)

OTHER PUBLICATIONS

Office Action Received for European Application No. 22725649.2 mailed on Jan. 9, 2024, 3 pages.

*Primary Examiner* — Shaqueal D Wade-Wright
(74) *Attorney, Agent, or Firm* — Schwegman Lundberg & Woessner, P.A.

(57) ABSTRACT

Generally discussed herein are devices, systems, and methods for binding with cryptographic key attestation. A method can include generating, by hardware of a device, a device public key and a device private key, based on the device private key, signing a first attestation resulting in a signed first attestation, the first attestation claiming the device private key originated from the hardware, based on the device public key and the signed first attestation, registering the device with a trusted authority, generating, by the hardware, a first application private key and a first application public key, and based on the device private key, signing a second attestation resulting in a signed second attestation, the second attestation claiming the first application private key originated from the hardware, and based on the first application public key and the signed second attestation, registering a first application of the device to a first server.

14 Claims, 4 Drawing Sheets

(51) Int. Cl.
*H04L 9/30* (2006.01)
*H04L 9/00* (2022.01)

(52) U.S. Cl.
CPC .......... *H04L 9/3265* (2013.01); *H04L 9/3268* (2013.01); *H04L 9/0877* (2013.01); *H04L 9/50* (2022.05)

(58) Field of Classification Search
CPC ....... H04L 9/3066; H04L 9/32; H04L 9/3265; H04L 9/3268; H04L 9/3249; H04L 9/3252; H04L 9/3263; H04L 9/50
See application file for complete search history.

(56) References Cited

U.S. PATENT DOCUMENTS

| | | | |
|---|---|---|---|
| 2017/0302459 A1* | 10/2017 | Fenner | H04L 9/3234 |
| 2017/0353319 A1* | 12/2017 | Scarlata | G09C 1/00 |
| 2018/0167208 A1* | 6/2018 | Le Saint | H04L 9/3265 |
| 2019/0028281 A1* | 1/2019 | Turissini | G06F 21/57 |
| 2020/0021445 A1* | 1/2020 | Caceres | G06F 21/44 |
| 2020/0042675 A1* | 2/2020 | Asanghanwa | H04L 63/123 |
| 2020/0396217 A1* | 12/2020 | Sinha | G06F 21/73 |
| 2022/0309502 A1* | 9/2022 | Ortiz | G06Q 20/202 |
| 2023/0325535 A1* | 10/2023 | Sharma | G06F 21/33 726/17 |

* cited by examiner

BINDING WITH CRYPTOGRAPHIC KEY ATTESTATION

CROSS REFERENCE TO RELATED APPLICATION

This application is a continuation of U.S. application Ser. No. 17/332,796, filed May 27, 2021 which application is incorporated herein by reference in its entirety.

BACKGROUND

Cryptographic key attestation technology is available in modern operating systems. For remote server applications running on other computers, cryptographic key attestation provides cryptographic attestation proof that an asymmetric application private key generated by a client application is stored in a hardware backed key store, such as trusted platform module (TPM) standard compliant hardware.

Typically, each client application will have the hardware backed key store generate an application specific application public and application private key pair. The application specific application public key, or a certificate generated based on the application public/application private key pair, can be used by a respective client application for registering an application identity securely with a respective remote application server. After the application identity (key) is registered securely, the application identity is used for subsequent authentication of the client application with the application server.

In general, such application specific application identity registration between various client/server applications occurs in different communication channels at separate times. There can be multiple unrelated client applications running on an operating system of a single client device. From the perspective of the application server, it is unknown whether any two application identities are associated with a same hardware backed key store (and thus the same client device).

There is a desire to associate different respective application identities to a hardware backed key store of a client device at an application server. Relating the respective application identities can help the application server leverage attestation claims made to another application server in determining whether the client device satisfies conditions for enrollment of the client.

SUMMARY

Embodiments provide an ability to bind multiple application identities to a hardware backed key store of a client device. The application identities are application public keys. The hardware backed key store generated (or includes) an associated device private/device public key pair and application private/application public key pairs. The hardware backed key store can sign attestation claims to different remote applications with a same device private key. This allows a remote application server to correlate signed attestation claims made to another remote application server to the hardware backed key store, and thus the client device associated with the signature. Such correlation was not deterministically possible previously as prior software-based solutions are not as secure as keys generated by the hardware backed key store, thus leaving doubt that the keys provided to different application servers are from the same device.

Embodiments solve the technical problem of securely correlating application keys with a same client device using at least one of a device public/device private key pair, a hardware backed key store, or remote key attestation. The hardware backed key store is a hardware device that protects against extraction of keys. A hardware backed key store that adheres to a Trusted Platform Module (TPM) specification is an example of a hardware backed key store. Associating different application identities (sometimes called application public keys) to the same hardware backed key store provides improved security at the application server. This is because the application server can leverage attested claims provided to another application server to determine whether the client device that includes the hardware backed key store satisfies conditions of enrollment. The conditions of enrollment help ensure that the client device does not have a security problem that can be exploited by an attacker to gain access to an application server hosting the application associated with enrollment.

A method, device, or machine-readable medium for cryptographic key attestation can generate (by hardware of a device) a device key pair, the device key pair including a device private key and a device public key. Based on the device private key a first attestation can be signed resulting in a signed first attestation. The first attestation can claim the device private key originated from the hardware. Based on the device public key and the signed first attestation, the device can be registered with a trusted authority. A first application key pair can be generated (e.g., by the hardware). The first application key pair can include a first application private key and a first application public key. Based on the device private key, a second attestation can be signed resulting in a signed second attestation. The second attestation can claim the first application private key originated from the hardware. Based on the first application public key and the signed second attestation, a first application of the device can be registered to a first server.

A certificate can be received from a trusted authority. The certificate can attest that the device private key originated from the hardware. Registering the first application of the device can include providing the certificate to the first server. Registering the device to an application or a trusted authority can include communication over a transport layer security channel.

A second application key pair can be generated. The second application key pair can include a second application private key and a second application public key. Based on the device private key, a third attestation can be signed resulting in a signed third attestation. Based on the second application public key and the signed third attestation, a second application of the device can be registered to a second server.

The device public key and the device private key can be derived from a hardware backed key that is unique to the hardware backed key store of the device. The device private key can include a Rivest-Shafir-Adleman (RSA) signing key or an elliptic curve cryptography (ECC) signing key.

A method, device, or machine-readable medium for cryptographic key attestation can receive (e.g., from a device) an application registration request. The application registration request can include an application public key and a signed attestation. Based on a device public key of the device, whether the signed attestation is bound to a hardware backed key store of the device can be verified. Responsive to verifying the signed attestation is bound to the hardware backed key store of the device, whether claims of the signed attestation satisfy a policy can be determined. Responsive to determining the claims satisfy the policy, the device can register with an application associated with the application registration request.

Verifying whether the signed attestation is bound to the hardware backed key store can include issuing, to a trusted authority, a request for the device public key. Verifying whether the signed attestation is bound to the hardware backed key store can include receiving, from the trusted authority, attestation status of the device public key and the device public key. A certificate can be received. The certificate can include an attestation that the device private key originated from the hardware backed key store and a signature of a trusted authority. A chain of trust of the certificate can be verified.

DETAILED DESCRIPTION

Figure 1:
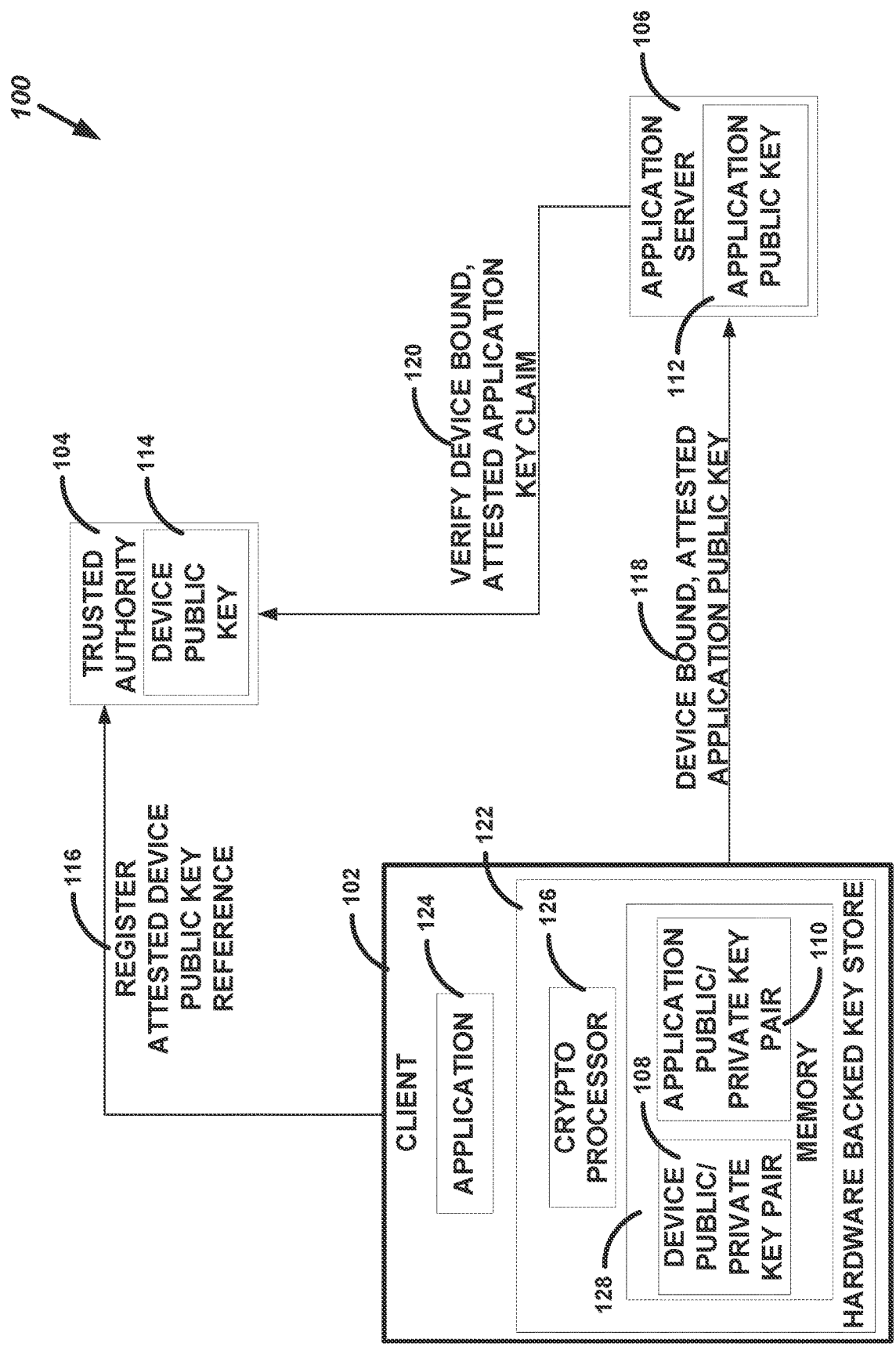
FIG. 1 illustrates, by way of example, a block diagram of an embodiment of a system for binding with cryptographic key attestation.

In the following description, reference is made to the accompanying drawings that form a part hereof, and in which is shown by way of illustration specific embodiments which may be practiced. These embodiments are described in sufficient detail to enable those skilled in the art to practice the embodiments. It is to be understood that other embodiments may be utilized and that structural, logical, and/or electrical changes may be made without departing from the scope of the embodiments. The following description of embodiments is, therefore, not to be taken in a limited sense, and the scope of the embodiments is defined by the appended claims.

Server applications can benefit from knowing if an application private key originates from a hardware backed key store. This knowledge is sometimes called "secure device binding" as the application private key is bound to the hardware backed key store. With knowledge of the hardware backed key store that originated the application private, the server applications can know that a device registered with a first server application is the same device registered with a second server application. Further, the server application can verify if one or more attestation claims are bound to the same client device. The server application can cryptographically verify that a claim is associated with the client device for any device association or correlation with the claim.

The mechanism that allows attestation claims to be bound to the same client can include using a hardware specific public/private key pair (e.g., an endorsement key (EK)) or a public/private key pair derived from the hardware specific public/private key pair (e.g., an attestation identity key (AIK)) to sign an attestation. The attestation signature can be used to verify that the application public/private key pair is associated with the device specific public/private key pair and is therefore associated with the device. The uniqueness of the device public/private key pair ensures that the same key is from the same device. Thus, the signature of the attestation can be leveraged to associate a first application public/private key pair and a second application public/private key pair with the same hardware.

The attestation claims regarding the device that includes the hardware made to the first application and the claims made to the second application that are associated with the same device signing key can be associated with the same device. The claims can include an identification of the device (similar to a serial number often universally and globally unique), manufacturer of the device, model of the device, status of the device (e.g., operating system, version, application, application version, device boot state (whether device was booted securely), debug port state (enabled or disabled), geographical position, measurements or integrity checks of running software, or the like), or a nonce (a random number generated by the server and returned to prevent replay and reuse).

Using embodiments, server applications can securely verify that attested key claims are from the same client device to make cryptographic decisions and determine trustworthiness of key attestation claims. Embodiments provide cryptographic proof that hardware attested key claims are bound to the same client device and server applications can use that knowledge to make decisions about client device association or correlation. This is not possible with as much certainty by using software based cryptographic key solutions because of the vulnerabilities of the keys generated by the software.

Reference will now be made to the FIGS. to describe further details of binding with cryptographic key attestation. In the FIGS. a reference number with a letter suffix refers to a specific instance of a general component. For example, a server 106A and a server 106B are specific instances of a general server 106.

FIG. 1 illustrates, by way of example, a block diagram of an embodiment of a system 100 for binding with cryptographic key attestation. FIG. 1, as illustrated, includes a client 102, a trusted authority (TA) 104, and an application server 106. The client 102 is a compute device that communicates with the server 106 to access functionality provided by an application of the server 106. The client 102 can include a mobile phone or other mobile compute device, an Internet of things (IoT) device, a desktop computer, a laptop, a tablet, a smart appliance, or other device capable of communicating with the application server 106 and the TA 104.

The client 102 is illustrated as including a hardware backed key store 122. The hardware backed key store 122 generates and stores cryptography keys for the client 102. The hardware backed key store 122 can include a hardware security module (HSM). The hardware backed key store 122 can conform to a standard, such as International Organization for Standardization (ISO) and International Electrotechnical Commission (IEC) ISO/IEC 11889. ISO/IEC compliant hardware is sometimes called a Trusted Platform Module (TPM). Other similar standards to which the hardware backed key store 122 can conform include the common criteria for information security evaluation (commonly referred to as "common criteria") detailed in ISO/IEC 15408 and Federal Information Processing Standards (FIPS) 140.

The hardware backed key store 122 can include a secure crypto processor 126 with one or more memories 128. The persistent and volatile memory can be accessible by only the crypto processor 126. The crypto processor 126 is a dedicated computer-on-a-chip or microprocessor for carrying out cryptographic operations, embedded in a packaging with multiple physical security measures, which give it a degree of tamper resistance. The hardware backed key store 122 can include or provide a hardware random number generator, facilities for securely generating cryptographic keys, remote attestation capabilities, binding capabilities, or sealing capabilities.

Remote attestation creates a nearly unforgeable hash key summary of the hardware and software configuration of the client 102. Binding encrypts data using a device private key of the device public/private key pair 108. Sealing is similar to binding but further identifies a state of the hardware backed key store 122 so that sealed data can be unsealed (decrypted). The client 102 can use the hardware backed key store 122 to authenticate with other entities, such as the TA 104 or the server application 106.

The hardware backed key store 122 can have a unique and secret public/private key pair (sometimes called an endorsement key (EK)) burned therein (written to unwritable memory) when it is produced. The device public/private key pair 108 can be derived, using the hardware backed key store 122, from the public/private key pair burned therein.

Cryptographic security at the hardware level is more secure than software-based cryptographic security. This is, at least in part, because the encryption process is separate from the rest of the compute device. This makes the encryption much harder to intercept or break. Hardware encryption also moves the cryptographic functions to hardware, thus relieving the burden on other parts of the device that would otherwise be responsible for the cryptographic operations.

The TA 104 is a third party (a party other than the client 102 or the application server 106) that is trusted to distribute cryptographic keys. The TA 104 can be a certificate authority (CA) that issues digital certificates. A digital certificate (or simply just "certificate") certifies ownership of a public key by a named subject of the certificate. The certificate allows a relying entity to rely on a signature or claim made about a private key that corresponds to the public key of the certificate (sometimes called a "certified public key"). A certificate can conform to a standard, such as an X.509 standard. Transport Layer Security (TLS) and Secure Socket Layer (SSL) communications conform to X.509 standard. Hypertext Transport Protocol Secure (HTTPS) uses TLS/SSL as a basis for securely browsing the web. When a certificate is signed by the TA 104, an entity holding the certificate can rely on the public key the certificate contains to establish a secure communication with another party, or validate data signed using the corresponding private key.

The application server 106 hosts functionality, the form of applications, that is accessible to trusted clients, such as the client 102. The application server 106 typically operates between the client 102 and a database server. The application server 106 will perform some operation on data, from the client 102, the database server, or a combination thereof. The application server 106 will then provide results of the operation or an acknowledgment that the operation was performed to the client 102.

For binding with cryptographic key attestation, the hardware backed key store 122 can generate the device public/private key pair 108. An operating system or application running on the client 102 can cause the hardware backed key store 122 to generate the device public/private key pair 108. The private key of the public/private key pair 108 can be attested and the corresponding public key can be registered with the TA 104 at operation 116. When registration is successful, the TA 104 can issue a certificate to the client 102. The public key 114 can be used by the server application server 106 or another application server as a binding key to verify an application public key 112 of an application public/private key pair 110 is from a same hardware backed key store 122 as the device public key 114.

An application 124 on the client 102 can attest its application specific private key using the device private key or the device public/private key pair, at operation 118. The application 124 can attest device claims by providing claims signed using the device private key of the device public/private key pair. The attestation claims signed by the device private key provide evidence that the application private key is stored in (and was generated by) the hardware backed key store 122.

The application server 106 can receive the application specific private key attestation from the client 102 at operation 118. The application server 106 can verify the attestation of the application private key of the application public/private key pair 110. The application server 106 can receive and verify attestation claims signed by the device private key. The verification can include a communication 120 to the TA 104. The communication can include the claims and a request for the TA to verify the claims or can include a request for the device public key 114 so that the application server 106 can verify the claims itself. Using the attestation of the claims signed by the device private key, the application server 106 can have evidence that the application public key 112 originated from the same hardware as the device public key 114. The verification can include decrypting the signature and verifying the decryption key (the device public key 114) is the proper key. In other words, the attestation claims signed by the device private key bind the application public key 112 and the device public key 114 to the same hardware backed key store 122.

Figure 2:
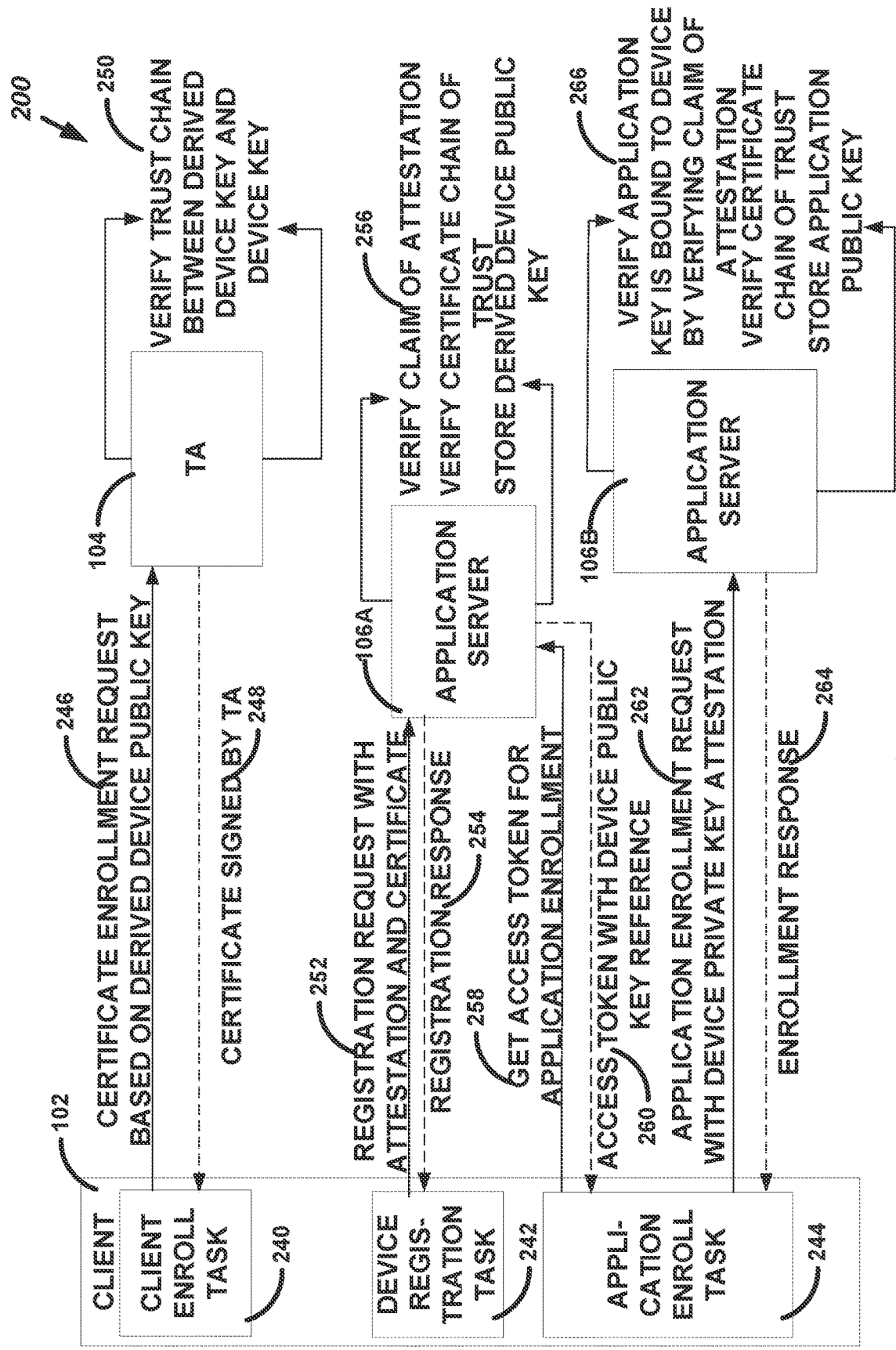
FIG. 2 illustrates, by way of example, a diagram of an embodiment of a system that operates with devices configured for binding with cryptographic key attestation.

FIG. 2 illustrates, by way of example, a diagram of an embodiment of a system 200 that operates with devices configured for binding with cryptographic key attestation. The system 200 as illustrated includes the client 102, the TA 104, and a first application server 106A and a second application server 106B. The client 102 as illustrated includes tasks 240, 242, 244 configured for performing binding with cryptographic key attestation.

A client enroll task 240 can perform a certificate enrollment with the TA 104. The certificate enrollment can include issuing a certificate enrollment request at operation 246. The hardware backed key store 122 (see FIG. 1) of the client 102 can generate, based on a device public key that was burned into the hardware backed key store 122 and is unique to the client 102, a derived device public/private key pair. The device public/private key pair 108 in FIG. 1 can be a derived device public/private key pair. A Microsoft® attestation identity key (AIK) attestation service is an example of the TA 104. Azure Active Directory (AD) and mobile device management (MDM) enrollment service, from Microsoft® Corporation of Redmond, Washington, United States are some examples of applications provided by application servers 106A, 106B.

The TA 104 can receive the certificate enrollment request. The TA 104 can verify a trust chain between the derived device public key and a device public key at operation 250. If the verification is successful, the TA 104 can provide a certificate signed using a private key of the TA 104 to the client 102, at operation 248.

After the client enroll task 240 has performed certificate enrollment with the TA 104, a device registration task 242 can provide a registration request at operation 252. The registration request can include an attestation with one or more claims and the certificate received at operation 248.

The application server 106A can perform one or more operations 256 based on the received registration request or other data received at operation 252. The operations 256 can include verifying the one or more claims of the attestation. Verifying the claims of the attestation can include decrypting a signature of the attestation using the derived device public key. The one or more operations 256 can include verifying a chain of trust of the received certificate. Verifying the chain of trust of the certificate can include identifying the entities that have signed the certificate. Verifying the chain of trust of the certificate can include determining whether the entities that have signed the certificate are trustworthy. The operations 256 can include storing the derived device public key, such as responsive to verifying the claims of the attestation and verifying the certificate chain of trust.

The application server 106A can provide a registration response to the client 102 at operation 254. The registration response can include an indication that registration was successful or denied.

The application enroll task 244 can enroll a client application with the application server 106B. In the Microsoft® MDM enrollment service process, and other application enrollment service processes, the client 102 can obtain an access token from Azure AD. Operation 258 can include a request for an application enrollment token from the application server 106A. The application server 106A can respond at operation 260 by providing the access token with a derived device public key reference.

The application enrollment task 244 can use the access token from the application server 106A to enroll with the application server 106B. Enrollment with the application server 106B can include providing an application enrollment request at operation 262. The application enrollment request can include the access token. The application enrollment request can include an application private key attestation that is signed using the derived device private key.

The application server 106B can determine whether to enroll the client task 244 with the application server 106B at operation 266. The operation 266 can ensure that the client 102 configuration meets a policy that defines minimum requirements for enrolling with the service. The policy can include data indicating device configuration requirements that can be satisfied by attested claims, cryptographic binding, or a combination thereof.

The operation 266 can include verifying the application key is bound to the device. Verifying the application public key is bound to the device can include decrypting a signature of an attestation with the derived device public key. Verifying the application public key is bound to the device can include verifying the certificate chain of trust includes only trusted entities. The operation 266 can include verifying the claims of the attestation, such as by decrypting the claims using the relevant cryptographic key. The operation 266 can further include comparing the claims to the policy to ensure that all requirements of the policy are met by the client 102.

At operation 264, the application server 106B can provide an enrollment response to the application enroll task 244. If the verifications are successful, the enrollment response can indicate enrollment was successful. If the verifications fail, the enrollment response can indicate that enrollment was denied. If registration or enrollment fails, the registration or enrollment responses can indicate the condition of the policy or certificate chain of trust that was not met.

The tasks 240, 242, 244 can be performed over different communication channels. A channel is a communication path between a source and a target. In the context of FIG. 2, example channels include a wireless communication channel, a virtual private network (VPN) channel, communication on a specified port (different ports being different channels), a management channel, or the like. One identity makes claims about the device over a first channel and those claims can be leveraged when another related identity is provided over a separate channel. The channel over which the security posture of the client 102 is proved, such as can be provided by the application enrollment task 244, can be different than another channel that relies on the security posture and is either incapable of receiving the security posture information or the channel is impractical to provide the security posture information.

Consider a VPN server that enforces a policy that requires the client 102 to have drive encryption enabled, bit locker enabled, and a firewall setting. Using prior approaches, the client 102 would provide those assertions over the VPN protocol, which is impractical due to the cumbersome nature of those communications and the lack of expertise in the VPN channel. Using embodiments, a first channel, such as a management channel (a communication channel between the client 102 and the server application 106B), can verify the security posture of the client 102 (e.g., whether the client 102 has drive encryption, bit locker enabled, and the firewall setting) and then that information can be leveraged by the VPN channel to avoid the cumbersome, impractical communication of providing the assertions over the VPN channel.

Figure 3:
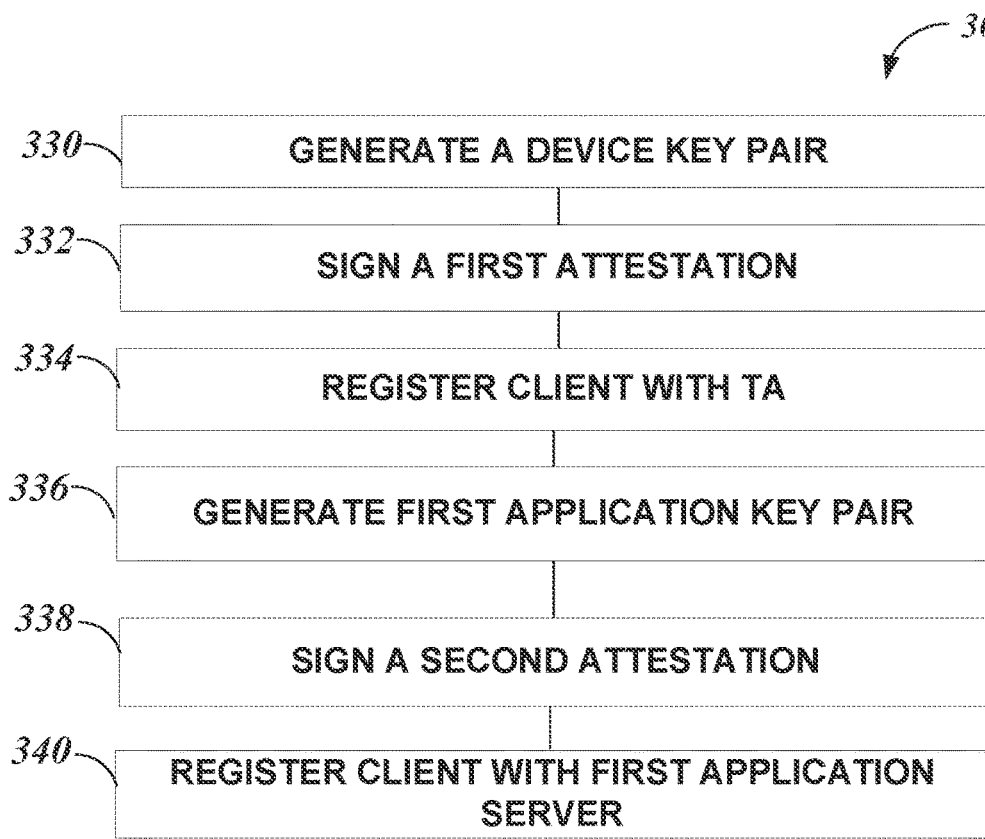
FIG. 3 illustrates, by way of example, a block diagram of an embodiment of a method for binding with cryptographic key attestation from a perspective of the client (see FIG. 1).

FIG. 3 illustrates, by way of example, a block diagram of an embodiment of a method 300 for binding with cryptographic key attestation from a perspective of the client 102 (see FIG. 1). The method 300 as illustrated includes generating a device key pair 108, at operation 330; signing a first attestation, at operation 332; registering the client 102 with the TA 104, at operation 334; generating a first application key pair, at operation 336; signing a second attestation, at operation 338; and registering the client 102 with a first application server 106, at operation 340. The operation 330 can be performed by the hardware backed key store 122 of the client 102. The device key pair 108 can include a device private key and a corresponding device public key.

The operation 332 can be performed based on the device private key. The first attestation can claim the device private key originated from the hardware backed key store 122. The operation 332 can result in a signed first attestation. The operation 334 can be performed based on the device public key 114 and the signed first attestation from operation 332. The operation 334 can include providing the signed first attestation and the device public key 114 to the TA 104.

The first application key pair can include a first application private key and a first application public key 112. The operation 338 can be performed based on the device private key. The second attestation can claim the device private key originated from the hardware backed key store 122. The operation 340 can be performed based on the first application public key 112 and the signed second attestation. The operation 340 can include providing the first application public key 112 and the signed second attestation to the application server 106.

The method 300 can further include (after, or as a result of operation 334) receiving, from the TA 104, a certificate attesting the device private key originated from the hardware. Attesting can include the TA 104 signing the certificate using a TA private key of TA public/private key pair. The client 102 can provide the certificate to the application server 106 at operation 340.

The operation 340 can include communication over a transport layer security (TLS) channel. A TLS channel is a communication channel that adheres to the TLS standard managed by Internet Engineering Task Force (IETF).

The method 300 can further include generating, by the hardware backed key store 122, a second application key pair. The second application key pair can include a second application private key and a second application public key. The method 300 can further include based on the device private key, signing a third attestation resulting in a signed third attestation. The method 300 can further include based on the second application public key and the signed third attestation, a second application of the client 102 to a second application server. The second application server can associate the second application public key with the same hardware backed key store 122 as the first application server 106 associates with the first application public key. The attestation claims associated with the hardware backed key store 122 can thus be consistent across the first and second application servers.

The device key pair generated at operation 330 can be a key burned into the hardware backed key store 122 or can be derived from the key burned into the hardware backed key store. The method 300 can include deriving the device public key and the device private key from a hardware backed key that is unique to the hardware backed key store 122 of the client. The device private key, application private key, or other key generated by the hardware backed key store can include a Rivest-Shafir-Adleman (RSA) signing key or an elliptic curve cryptography (ECC) signing key.

Figure 4:
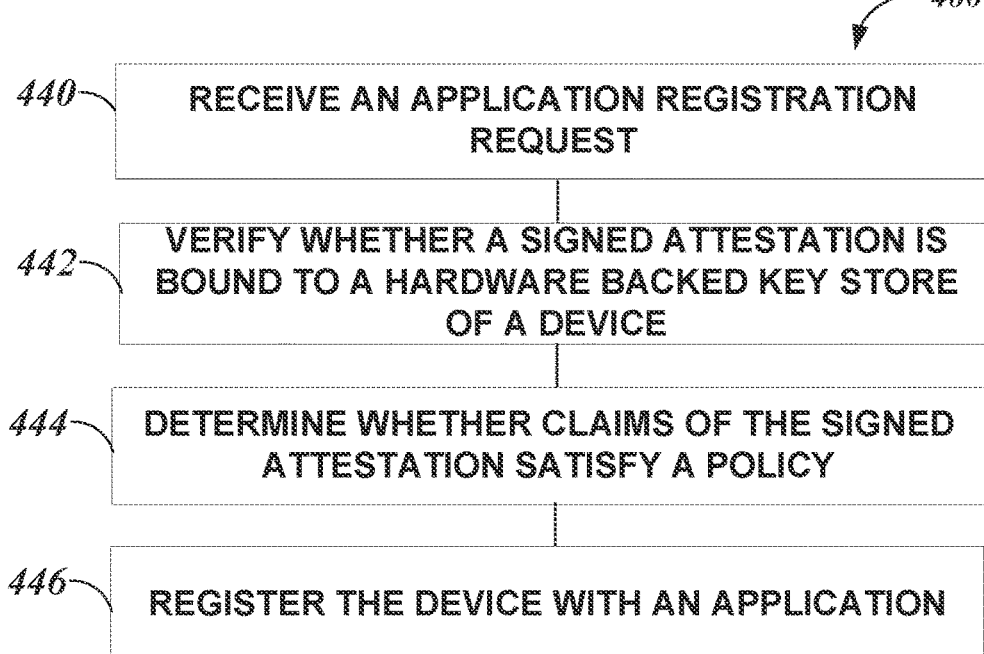
FIG. 4 illustrates, by way of example, a block diagram of an embodiment of a method for binding with cryptographic key attestation from a perspective of the application server (see FIG. 1).

FIG. 4 illustrates, by way of example, a block diagram of an embodiment of a method 400 for binding with cryptographic key attestation from a perspective of the application server 106 (see FIG. 1). The method 400 as illustrated includes receiving an application registration request, at operation 440; verifying whether a signed attestation is bound to a hardware backed key store of a device, at operation 442; determining whether claims of the signed attestation satisfy a policy, at operation 444; and registering the device with an application, at operation 446. The application registration request from operation 440 can be from the client 102. The application registration request from operation 440 can include an application public key and a signed attestation. The signed attestation can include a claim that the application private key originated from a hardware backed key store 122 of the client 102. A signature of the attestation can include a payload encrypted using a device private key that is bound to the hardware backed key store 122.

The operation 442 can be performed based on the device public key 114 of the device. The operation 444 can be performed responsive to verifying the signed attestation is bound to the hardware backed key store 122 of the client 102. The operation 444 can be performed responsive to determining the claims satisfy the policy. The policy can indicate claims regarding the configuration of the client 102. The claims can include an identification of the device (similar to a serial number often universally and globally unique), manufacturer of the device, model of the device, status of the device (e.g., operating system, version, application, application version, device boot state (whether device was booted securely), debug port state (enabled or disabled), geographical position, measurements or integrity checks of running software, or the like), or a nonce (a random number generated by the server and returned to prevent replay and reuse).

The operation 442 can include issuing, to the TA 104, a request for the device public key 114. The operation 442 can include receiving, from the TA 104, attestation status of the device public key 114 and the device public key 114.

The method 400 can further include receiving, from the TA 104, a certificate signed by the TA 104. The certificate can certify that the private key originated from the hardware backed key store 122. The certificate can certify one or more claims about the private key provided in the registration request from operation 440.

What follows in an explanation of steps for binding with cryptographic key attestation that are performed using a client 102 with a Windows® operating system. A Windows® client device can include a hardware backed key store that conforms to the TPM standard. A TPM compliant device can use the EK or an EK certificate as a secure root of trust. The EK is unique to the TPM compliant device and changing the EK essentially changes the device into a new one. Because the EK and EK certificate are unique for each device and does not change, using the EK or the EK certificate can present privacy concerns. The EK or the EK certificate could be used to track a specific device. To avoid this privacy problem, some version of Windows® issue a derived attestation anchor based on the EK or EK certificate. This intermediate key, which can be attested to an EK, is the AIK and the corresponding certificate is called the AIK certificate. The AIK includes an asymmetric public/private key pair that can be used as a substitute for the EK as an identity for the TPM compliant device. The private portion of the AIK (the AIK private key) is never revealed or used outside the hardware backed key store and can only be used inside the hardware backed key store for a limited set of operations, such as for signing, and only for limited operations defined in the TPM standard.

The operating system causes the TPM compliant hardware backed key store to create an AIK that is protected by the TPM compliant hardware backed key store. The AIK can include a Rivest-Shamir-Adleman (RSA) or Elliptic Curve Cryptography (ECC) signing key and corresponding decryption key. Microsoft® hosts a cloud service called Microsoft® Cloud CA or AIK Attestation Service that is configured to establish, cryptographically, the following facts: (1) that it is communicating with a real TPM compliant hardware backed key store and (2) that the TPM compliant hardware backed key store possesses the presented AIK. After the Microsoft® Cloud CA service has established these facts, the Microsoft® Cloud CA can issue an AIK certificate to the Windows® client.

In terms of Windows® and TPM compliant device based operations, the client 102 can generate the AIK public/private key pair based on the EK. A CertEnroll task, a specific instance of the task 240, can send a certificate enrollment request based on Windows® AIK to a Microsoft® AIK Attestation Service, which is a specific example of the TA 104. The Microsoft® AIK Attestation service can verify that the AIK is a part of a TPM endorsement key trust chain. If the AIK is verified, the Microsoft® AIK Attestation Service can issue an AIK certificate. Windows® components can uses this Windows AIK, AIK certificate to attest for claims of other cryptographic private keys generated on the same Windows® client device.

An NCryptCreateClaim application programming interface (API) of Windows® can use the Windows® AIK to create key attestation claims for Azure AD join/registration device private key. The Windows AIK attested key claims can be provided to the Azure AD during an Azure AD device join/registration process.

An Azure AD device join/registration key (an example of an application key) can be used as the common device key because Azure AD is a TA. The Azure AD can verify key attestation claims of Azure AD device join/registration key using a Windows® NCryptVerifyClaim API. Azure AD can verify Windows AIK certificate chains to Microsoft Cloud CA (an example of a root of trust) to ensure that keys originated from a trusted TPM compliant hardware backed key store. Azure AD can store device public key references of Windows AIK public key, Azure AD device join/registration public key and device join/registration key attestation status.

For Windows® MDM Client enrollment application, an example of an application provided by the application server 106B, the client 102 can get an Azure AD access token with device public key reference for MDM enrollment service from the Azure AD, which is a specific example of an application provided by the application server 106A. The client 102 can use the same Windows® AIK to create key attestation claims for an MDM enrollment certificate private key using the Windows® NCryptCreateClaim API. The client 102 can send a signed soap request with Windows® AIK attested key claims along with the Azure AD access token providing proof of possession of the device private key to MDM Enrollment service. SOAP was formerly known as simple object access protocol. SOAP is a messaging protocol specification for exchanging structured information in the implementation of web services.

The MDM enrollment service can verify that the Azure AD signed the access token using an AAD signing cert. The MDM enrollment service can verify the MDM client, which is a specific instance of the task 244, signed soap request came from the same device using device public key reference provided by Azure AD. The MDM enrollment service can verify key attestation claims of MDM enrollment certificate key using Windows® NCryptVerifyClaim API. The MDM enrollment service can verify Windows AIK certificate chains to Microsoft Cloud CA to ensure that keys originated from a trusted TPM compliant hardware backed key store.

Figure 5:
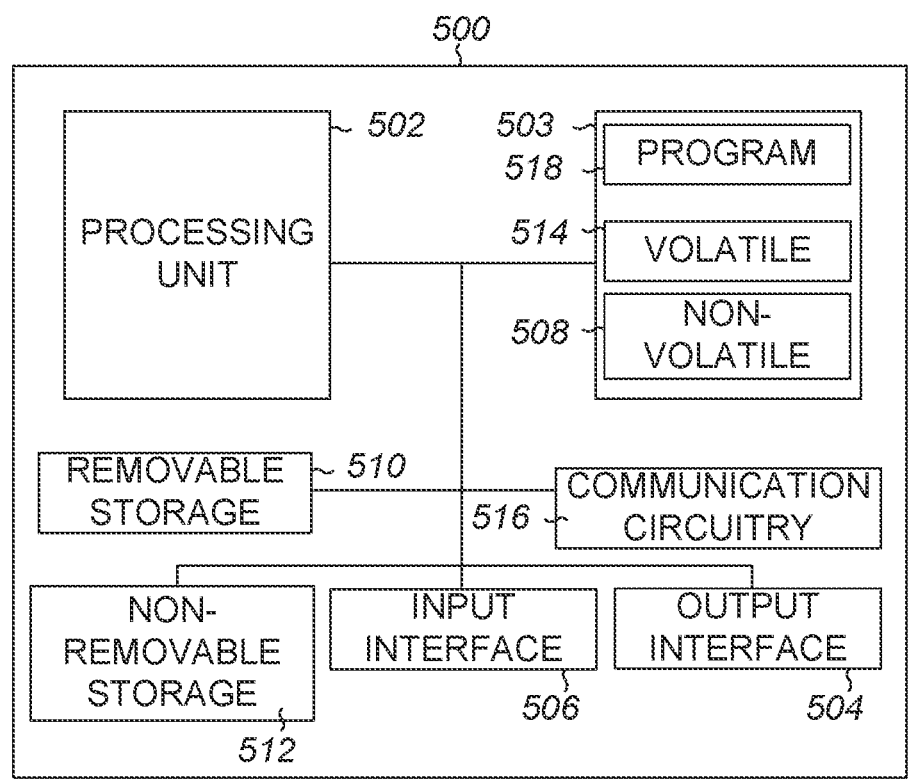
FIG. 5 illustrates, by way of example, a block diagram of an embodiment of a machine (e.g., a computer system) to implement one or more embodiments.

FIG. 5 illustrates, by way of example, a block diagram of an embodiment of a machine 500 (e.g., a computer system) to implement one or more embodiments. The machine 500 can implement a technique for binding with cryptographic key attestation. The client 102, TA 104, server 106, 106A, 106B, or a component thereof can include one or more of the components of the machine 500. One or more of the client 102, TA 104, server 106, 106A, 106B, method 300, method 400, or a component or operations thereof can be implemented, at least in part, using a component of the machine 500.

One example machine 500 (in the form of a computer), may include a processing unit 502, memory 503, removable storage 510, and non-removable storage 512. Although the example computing device is illustrated and described as machine 500, the computing device may be in different forms in different embodiments. For example, the computing device may instead be a smartphone, a tablet, smartwatch, or other computing device including the same or similar elements as illustrated and described regarding FIG. 5. Devices such as smartphones, tablets, and smartwatches are generally collectively referred to as mobile devices. Further, although the various data storage elements are illustrated as part of the machine 500, the storage may also or alternatively include cloud-based storage accessible via a network, such as the Internet.

Memory 503 may include volatile memory 514 and non-volatile memory 508. The machine 500 may include—or have access to a computing environment that includes—a variety of computer-readable media, such as volatile memory 514 and non-volatile memory 508, removable storage 510 and non-removable storage 512. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 500 may include or have access to a computing environment that includes input 506, output 504, and communication circuitry 516. Output 504 may include a display device, such as a touchscreen, that also may serve as an input device. The input 506 may include one or more of a touchscreen, touchpad, mouse, keyboard, camera, one or more device-specific buttons, one or more sensors integrated within or coupled via wired or wireless data connections to the machine 500, and other input devices. The computer may operate in a networked environment using the communications circuitry 516 to connect to one or more remote computers, such as database servers, including cloud-based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

The communications circuitry 516 can include electric or electronic components configured to perform communication operations of the client 102. The electric or electronic components can include an input/output port (e.g., Ethernet port, Universal Serial Bus (USB), or the like), antenna, modulator, oscillator, demodulator, phase locked loop (PLL), amplifier, resistor, transistor, capacitor, diode, logic gate (e.g., AND, OR, XOR, negate, buffer), multiplexer, processing unit (e.g., central processing unit (CPU), application specific integrated circuit (ASIC), field programmable gate array (FPGA), graphics processing unit (GPU), or the like), radio transmitter, radio receiver, radio transceiver, a combination thereof, or the like.

Computer-readable instructions stored on a computer-readable storage device are executable by the processing unit 502 (sometimes called processing circuitry) of the machine 500. A hard drive, CD-ROM, and RAM are some examples of articles including a non-transitory computer-readable medium such as a storage device. For example, a computer program 518 may be used to cause processing unit 502 to perform one or more methods or algorithms described herein.

The operations, functions, or algorithms described herein may be implemented in software in some embodiments. The software may include computer executable instructions stored on computer or other machine-readable media or storage device, such as one or more non-transitory memories (e.g., a non-transitory machine-readable medium) or other type of hardware based storage devices, either local or networked. Further, such functions may correspond to subsystems, which may be software, hardware, firmware, or a combination thereof. Multiple functions may be performed in one or more subsystems as desired, and the embodiments described are merely examples. The software may be executed on a digital signal processor, ASIC, microprocessor, central processing unit (CPU), graphics processing unit (GPU), field programmable gate array (FPGA), or other type of processor operating on a computer system, such as a personal computer, server or other computer system, turning such computer system into a specifically programmed machine. The functions or algorithms may be implemented using processing circuitry, such as may include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, field programmable gate arrays (FPGAs), or the like).

Additional Notes and Examples

Example 1 can include a method including generating, by hardware of a device (e.g., TPM compliant hardware), a device key pair, the device key pair including a device private key and a device public key, Example 1 can include, based on the device private key, signing a first attestation resulting in a signed first attestation, the first attestation claiming the device private key originated from the hardware. Example 1 can include based on the device public key and the signed first attestation, registering the device with a trusted authority. Example 1 can include generating, by the hardware, a first application key pair, the first application key pair eluding first application private key and a first application public key. Example 1 can include based on the device private key, signing a second attestation resulting in a signed second attestation, the second attestation claiming the first application private key originated from the hardware. Example 1 can include, based on the first application public key and the signed second attestation, registering a first application of the device to a first server.

Example 1 provides an ability to relate application specific client identities to a client device (e.g., a hardware backed key store of the client device). Such a relation can help an application server leverage attestation claims made to another application server in determining whether to enroll the client. Such correlation was not deterministically possible previously as prior software-based solutions are not as secure as keys generated by the hardware backed key store, thus leaving doubt that the key provided is from the same device. Example 1 helps solve the technical problem of securely correlating application keys with a same client device using a device private key, a hardware backed key store, or remote key attestation. Associating different application identities to the same hardware backed key store, thus provides improved security at the application server, as the application server can leverage attested claims to determine whether the client device that includes the hardware backed key store satisfies conditions of enrollment. The conditions of enrollment help ensure that the client device does not have a security problem that can be exploited by an attacker to gain access to an application server hosting the application associated with enrollment.

In Example 2, Example 1 can further include receiving, from the trusted authority, a certificate attesting the device private key originated from the hardware, and wherein registering the first application of the device includes providing the certificate to the first server.

In Example 3, at least one of Example 1-2 can further include, wherein registering the device and the first application includes communication over a transport layer security channel.

In Example 4, at least one of Example 1-3 can further include generating, by the hardware, a second application key pair, the second application key pair including a second application private key and a second application public key. Example 4 can further include, based on the device private key, signing a third attestation resulting in a signed third attestation. Example 4 can further include based on the second application public key and the signed third attestation, registering a second application of the device to a second server.

In Example 5, at least one of Example 1-4 can further include deriving the device public key and the device private key from a hardware backed key that is unique to the hardware backed key store of the device.

In Example 6, at least one of Example 1-5 can further include, wherein the device private key is a Rivest-Shafir-Adleman (RSA) signing key or an elliptic curve cryptography (ECC) signing key.

Example 7 can include a device configured for performing the method of at least one of Example 1-6.

Example 8 can include a (e.g., non-transitory) machine-readable medium including instructions that, when executed by a machine, cause the machine to perform the method of at least one of Example 1-6.

Example 9 can include a method comprising receiving, from a device, an application registration request, the application registration request including an application public key and a signed attestation. Example 9 can further include based on a device public key of the device, verifying whether the signed attestation is bound to a hardware backed key store of the device. Example 9 can further include responsive to verifying the signed attestation is bound to the hardware backed key store of the device, determining whether claims of the signed attestation satisfy a policy. Example 9 can further include, responsive to determining the claims satisfy the policy, registering the device with an application associated with the application registration request.

Example 9 provides an ability to relate application specific client identities to a client device (e.g., a hardware backed key store of the client device). Such a relation can help an application server leverage attestation claims made to another application server in determining whether to enroll the client. Such correlation was not deterministically possible previously as prior software-based solutions are not as secure as keys generated by the hardware backed key store, thus leaving doubt that the key provided is from the same device. Example 1 helps solve the technical problem of securely correlating application keys with a same client device using a device private key, a hardware backed key store, or remote key attestation. Associating different application identities to the same hardware backed key store, thus provides improved security at the application server, as the application server can leverage attested claims to determine whether the client device that includes the hardware backed key store satisfies conditions of enrollment. The conditions of enrollment help ensure that the client device does not have a security problem that can be exploited by an attacker to gain access to an application server hosting the application associated with enrollment.

In Example 10, Example 9 can further include, wherein verifying whether the signed attestation is bound to the hardware backed key store includes issuing, to a trusted authority, a request for the device public key. Example 10 can further include receiving, from the trusted authority, attestation status of the device public key and the device public key.

In Example 11, at least one of Examples 7-8 can further include receiving a certificate, the certificate including an attestation that the device private key originated from the hardware backed key store and a signature of a trusted authority. Example 11 can further include verifying a chain of trust of the certificate.

Example 12 can include a device configured for performing the method of at least one of Examples 9-11.

Example 13 can include a (e.g., non-transitory) machine-readable medium including instructions that, when executed by a machine, cause the machine to perform the method of at least one of Examples 9-11.

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A device comprising:
   a hardware backed key store configured to:
   based on a device private key of a device key pair, sign a first attestation resulting in a signed first attestation, the first attestation claiming the device private key originated from a hardware backed key store;
   based on the device private key, sign a second attestation resulting in a signed second attestation, the second attestation claiming a first application private key of a first application key pair originated from the hardware backed key store;
   communications circuitry configured to:
   based on a device public key of the device key pair and the signed first attestation, register the device with a trusted authority;
   based on a first application public key of the first application key pair and the signed second attestation, register a first application of the device to a first server; and
   receive, from the trusted authority, a certificate attesting the device private key originated from the hardware backed key store.

2. The device of claim 1, wherein registering the device and the first application includes communication over a transport layer security channel.

3. The device of claim 1, wherein:
   the hardware backed key store is further configured to, based on the device private key, sign a third attestation resulting in a signed third attestation; and
   the communications circuitry is further configured to, based on a second application public key of a second application key pair and the signed third attestation, register a second application of the device to a second server.

4. The device of claim 1, wherein the hardware backed key store is further configured to derive the device public key and the device private key from a hardware backed key that is unique to the hardware backed key store of the device.

5. The device of claim 1, wherein the device private key is a Rivest-Shafir-Adleman (RSA) signing key or an elliptic curve cryptography (ECC) signing key.

6. A method comprising:
   based on a device private key of a device key pair, signing a first attestation resulting in a signed first attestation, the first attestation claiming the device private key originated from specified hardware of a device;
   based on a device public key of the device key pair and the signed first attestation, registering the device with a trusted authority;
   based on the device private key, signing a second attestation resulting in a signed second attestation, the second attestation claiming a first application private key of a first application key pair originated from the specified hardware;
   receive, from a trusted authority, a certificate attesting the device private key originated from the specified hardware; and
   based on a first application public key of the first application key pair, the signed second attestation, and the certificate, registering a first application of the device to a first server.

7. The method of claim 6, wherein registering the device and the first application includes communication over a transport layer security channel.

8. The method of claim 6, further comprising:
   based on the device private key, signing a third attestation resulting in a signed third attestation; and
   based on a second application public key of a second application key pair and the signed third attestation, registering a second application of the device to a second server.

9. The method of claim 6, further comprising deriving the device public key and the device private key from a hardware backed key that is unique to the specified hardware.

10. The method of claim 6, wherein the device private key is a Rivest-Shafir-Adleman (RSA) signing key or an elliptic curve cryptography (ECC) signing key.

11. A non-transitory machine-readable medium including instructions stored thereon that, when executed by a device, cause the device to perform operations comprising:
    based on a device private key of a device key pair, signing a first attestation resulting in a signed first attestation, the first attestation claiming the device private key originated from hardware of the device;
    based on a device public key of the device key pair and the signed first attestation, registering the device with a trusted authority;
    based on the device private key, signing a second attestation resulting in a signed second attestation, the second attestation claiming a first application private key of a first application key pair originated from the hardware;
    receive, from the trusted authority, a certificate attesting the device private key originated from the hardware; and
    based on a first application public key of the first application key pair, the signed second attestation, and the certificate, registering a first application of the device to a first server.

12. The non-transitory machine-readable medium of claim 11, wherein registering the device and the first application includes communication over a transport layer security channel.

13. The non-transitory machine-readable medium of claim 11, wherein the operations further comprise:
    based on the device private key, signing a third attestation resulting in a signed third attestation; and based on a second application public key of a second application key pair and the signed third attestation, registering a second application of the device to a second server.

14. The non-transitory machine-readable medium of claim 12, wherein the operations further comprise deriving the device public key and the device private key from a hardware backed key that is unique to the hardware.

* * * * *